C. C. BLISS.
Stop-Cock or Valve.
No. 202,982. Patented April 30, 1878.
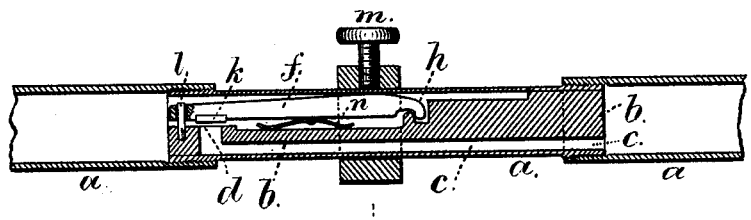
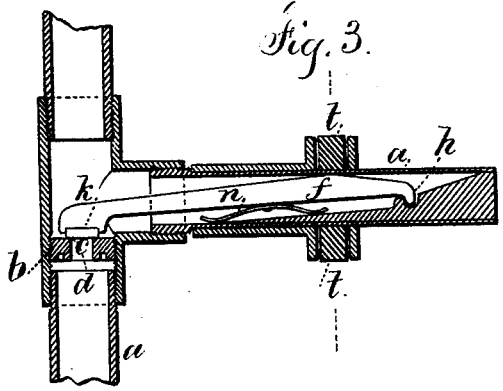
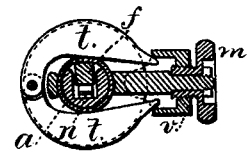
Witnesses,
Chas. H. Smith
Geo. T. Pinckney
Inventor
Charles C. Bliss.
per Lemuel W. Serrell
atty

UNITED STATES PATENT OFFICE.

CHARLES C. BLISS, OF NORWICH, CONNECTICUT.

IMPROVEMENT IN STOP-COCKS OR VALVES.

Specification forming part of Letters Patent No. 202,982, dated April 30, 1878; application filed November 6, 1877.

*To all whom it may concern:*

Be it known that I, CHARLES C. BLISS, of Norwich, in the county of New London and State of Connecticut, have invented an Improvement in Stop-Cocks or Valves, of which the following is a specification:

This improvement relates to a stop-cock that is adapted to the tube of a lamp between the fountain and the burner; but it may be used for any other purpose wherever available.

The coal-oil that is so extensively used in lamps will penetrate between metallic surfaces; hence it is very difficult to grind any cock or valve tight, so that there will not be any leakage.

I employ a tube or metal container that is complete and without perforation, and within the same is a channel for the liquid and a valve-seat, to which a lever-valve is applied, and this valve is closed by the action of a screw pressing upon the outside of the pipe or container, and springing the same and operating the lever-valve.

In the drawings, Figure 1 is a longitudinal section, and Fig. 2 is a cross-section, of my said improvement. Fig. 3 is a longitudinal section, and Fig. 4 a cross-section, of a modification in the arrangement of the parts.

The tube $a$ is to convey oil or other liquids from one place to another. This tube receives within it the plug $b$, that is permanently secured into the tube $a$ by solder or otherwise, so that the liquid will not leak past the plug. Through or at one side of this plug $b$ there is a hole or channel, $c$, that, in Fig. 1, connects with a lateral opening and valve-seat, $d$. In Fig. 1 this plug is long, and one side of the same is removed so as to give space for the introduction of the lever $f$. At one end of this lever is a hooked bearing, forming a fulcrum at $h$, and near the other end is a valve at $k$, and, by preference, there is a guide pin or stud, $l$, to retain the lever in position.

The spring $n$ serves to lift the lever and valve to open the passage-way through the stop-cock, and the screw $m$ acts to close the said cock. This screw $m$ passes through a stirrup or clip around the tube $a$, and the end of the screw presses upon the outside of the pipe or container, or upon an intervening shoe. The metal $a$ is sufficiently thin for the pressure of the screw to change its shape and spring the metal enough to operate the lever $f$ and press its valve upon the seat to close the orifice through the plug $b$.

The reverse movement of the screw allows of the valve being opened by the spring $n$, the metal of $a$ springing back to its normal condition.

If desired, the parts may be arranged as shown in Figs. 3 and 4, in which the lever $f$ is within a container, formed as a branch or T, and the valve is in the main tube.

The lever $f$ is moved to open or close the valve by the screw $m$ acting upon and springing the metal of this tube $a$, as before described; but, instead of acting directly upon the tube, it is shown as acting at opposite sides of the tube by means of hinged clamps $t$, that are around the tube, and are moved toward each other by the screw-nut $v$, or allowed to expand by the reverse movement, and thus operate the lever and valve.

By preference, the lever and valve are arranged so that the valve is closed by the action of the spring upon the lever, and opened by the pressure of the clamps upon the container.

I claim as my invention—

1. The tube $a$, plug $b$, orifice $c$, and lever-valve $f\ k$ within the tube $a$, in combination with the screw $m$ outside the said tube $a$, and acting in the manner and substantially as set forth.

2. The combination, with a lever and valve within a closed metallic container, of a screw or other presser outside the same, and acting to spring the metal of the container and operate the valve, substantially as set forth.

Signed by me this 29th day of October, A. D. 1877.

CHARLES C. BLISS.

Witnesses:
SOLOMON LUCAS,
WM. H. JENNINGS, Jr.